(12) United States Patent
Batti et al.

(10) Patent No.: US 9,341,518 B2
(45) Date of Patent: May 17, 2016

(54) METHOD AND APPARATUS FOR REMOTELY MONITORING LIQUID FOOD PRODUCTS

(71) Applicant: Innovative Control Technologies, LLC, Banks, OR (US)

(72) Inventors: Stephen A. Batti, Banks, OR (US); Erik Magner, Fort Wayne, IN (US); Mark B. Roberts, Beaverton, OR (US)

(73) Assignee: Innovative Control Technologies, LLC, Banks, OR (US)

( * ) Notice: Subject to any disclaimer, the term of this patent is extended or adjusted under 35 U.S.C. 154(b) by 294 days.

(21) Appl. No.: 14/011,139

(22) Filed: Aug. 27, 2013

(65) Prior Publication Data

US 2015/0059469 A1 Mar. 5, 2015

(51) Int. Cl.
*G01K 1/14* (2006.01)
*G01F 23/22* (2006.01)

(52) U.S. Cl.
CPC ........... *G01K 1/14* (2013.01); *G01F 23/22* (2013.01); *G01K 2207/06* (2013.01); *G01K 2215/00* (2013.01)

(58) Field of Classification Search
None
See application file for complete search history.

(56) References Cited

U.S. PATENT DOCUMENTS

| | | | |
|---|---|---|---|
| 782,433 A | 2/1905 | Ashley | |
| 2,035,334 A | 5/1932 | Monrad | |
| 3,277,714 A | 10/1966 | Crandell et al. | |
| 5,299,356 A | 4/1994 | Maxwell, III | |
| 5,463,375 A * | 10/1995 | Bauer | 340/517 |
| 6,220,746 B1 | 4/2001 | Stern | |
| 6,698,923 B2 | 3/2004 | Bedetti et al. | |
| 6,850,861 B1 | 2/2005 | Faiola et al. | |
| 6,942,377 B1 | 9/2005 | Goldstein | |
| 7,287,426 B2 | 10/2007 | Frank | |
| 7,302,846 B2 | 12/2007 | Hadala | |
| 2002/0066315 A1 * | 6/2002 | Acht et al. | 73/295 |
| 2002/0124737 A1 * | 9/2002 | Bedetti et al. | 99/342 |
| 2005/0263008 A1 | 12/2005 | Nagasaki et al. | |

(Continued)

FOREIGN PATENT DOCUMENTS

EP 1628560 B1 11/2007

OTHER PUBLICATIONS

Amazon.com—KitchenAid Gourmet Digital Probe Thermometer by KitchenAid (1 Amazon.com web page).
Amazon.com—Maverick ET-710S RediChek Remote Wireless Cooking Thermometer With LCD Transmitter, by Maverick (1 Amazon.com web page).
Amazon.com—three Amazon.com web pages of food thermometer products.

(Continued)

*Primary Examiner* — Andre Allen
(74) *Attorney, Agent, or Firm* — Woodard, Emhardt, Moriarty, McNett & Henry, LLP

(57) ABSTRACT

A device for monitoring the temperature and level of liquid food in a container is provided. The device includes an upper base and a lower elongate housing member. A plurality of temperature sensors are located along the length of the elongate housing member. The device may include a retaining lip which allows the device to be hung over the edge of a food container, with the elongate housing member extending down into the liquid food. Signals received from the individual sensors can be used to determine both the temperature of the liquid and the level or volume of the liquid in the container, using the known distances between the individual sensors. Information regarding the liquid temperature and level can then be transmitted from the monitoring device to an external receiver. The device may also comprise an energy harvesting device which converts heat energy from the liquid into electrical energy.

18 Claims, 12 Drawing Sheets

(56) References Cited

U.S. PATENT DOCUMENTS

| | | | |
|---|---|---|---|
| 2008/0036615 A1* | 2/2008 | Lyall, III | 340/614 |
| 2008/0043809 A1* | 2/2008 | Herbert | 374/163 |
| 2010/0033188 A1* | 2/2010 | Rieth | 324/438 |
| 2014/0028445 A1* | 1/2014 | Wild | 340/10.3 |
| 2014/0164797 A1* | 6/2014 | Marx | H02J 7/32 |
| | | | 713/300 |

OTHER PUBLICATIONS

E-Control Systems, Inc.; IntelliSensor for Temperature and Door—Sherman Oaks, CA (1 page).

TempTrack Temperature Monitoring and Alerting Systems, 2003-2013 Copyright; E2E IT Solutions Pty Ltd., ABN 13 103 708 541 (10 pages from TempTrack website).

\* cited by examiner

METHOD AND APPARATUS FOR REMOTELY MONITORING LIQUID FOOD PRODUCTS

BACKGROUND

The present disclosure relates to food monitoring, and more specifically, to a method and apparatus for measuring the temperature and level of a liquid food in a container.

Many restaurants and food service providers prepare and sell soups. Once the soup is prepared, it is typically stored in bulk in a heated container, such as a soup well which is heated from below or from the sides by steam, hot water, or other methods of heating. Individual portions are then removed from the container over a period of a few hours or longer as customers purchase the portions for consumption.

The soups need close monitoring to ensure safe food temperatures and fill levels, and to ensure availability and prevent burning the bottom of the soup well. Based on federal law and local regulations, the restaurant operators are required to measure all soup temperatures frequently, such as every hour, and record the temperatures, allowing public health officials to inspect current and past measurements. The recording is often done manually by writing in a paper form and then collecting these forms in a file folder. This procedure has numerous drawbacks. For example, restaurant employees may fail to measure and record temperature measurements in a timely or consistent manner. Manual entry is also problematic given the opportunity for error in translation due to sloppy handwriting or misfiling and other human error. Even when performed properly, such manual periodic measurement and recording may miss intermittent temperature fluctuations that occur between recording times.

Certain prior art systems have been developed to monitor soup temperatures. Some of these systems use wireless devices incorporated into a thermometer or other device which is left partially submerged in the soup. Signals output by the wireless device are received by a separate computer and recorded. However, these devices typically only monitor temperature and fail to sense liquid level, or require the addition of complex circuitry, such as separate temperature sensing and level sensing hardware. This adds cost to the system and increases the chance of component failure. In addition, prior art sensing devices which incorporate wireless monitoring depend on battery power to run the sensing device, and thereby require frequent battery changes. Each time the battery is changed, a compartment must be opened within the sensing device, which can allow food or other contamination into the device components, causing failures, and/or allow material within the device to escape and contaminate the soup. Thus, there is a need for improvement in this field.

SUMMARY

According to one embodiment of the disclosure, a liquid food monitoring device is disclosed, comprising an upper base, an elongate housing member extending downward from the upper base, a plurality of vertically spaced temperature sensors mounted to the elongate housing member, and a transmitter operatively connected to the temperature sensors. The transmitter may comprise a wireless transmitter which is configured to transmit signals from the plurality of temperature sensors to an external receiver, the signal indicative of temperatures being sensed by the temperature sensors. The signals may be further indicative of the level of the liquid in a container. The device may further comprise an energy source, such as an energy harvesting device, operatively coupled to the transmitter. The energy source may convert heat energy from the liquid to electrical energy for powering the wireless transmitter. The device may be optionally configured as a stir stick, a ladle, or other culinary instrument, or incorporated permanently or removably in the soup well or other food container. The device may optionally include a retaining lip in a lower end of the upper base to maintain the position of the monitoring device when placed over an upper edge of a container.

According to another embodiment, a system for monitoring liquid food in a container is disclosed, comprising a monitoring device configured to be at least partially immersed in the liquid food, the monitoring device having a transmitter and plurality of vertically spaced temperature sensors disposed along an elongate housing member, and a receiver locate remote from the monitoring device and configured to receive signals being transmitted by the transmitter. The transmitter may comprise a wireless transmitter. The receiver may be configured to determine a level of the liquid food in the container by comparing a difference in temperature being sensed by at least two of the temperature sensors.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
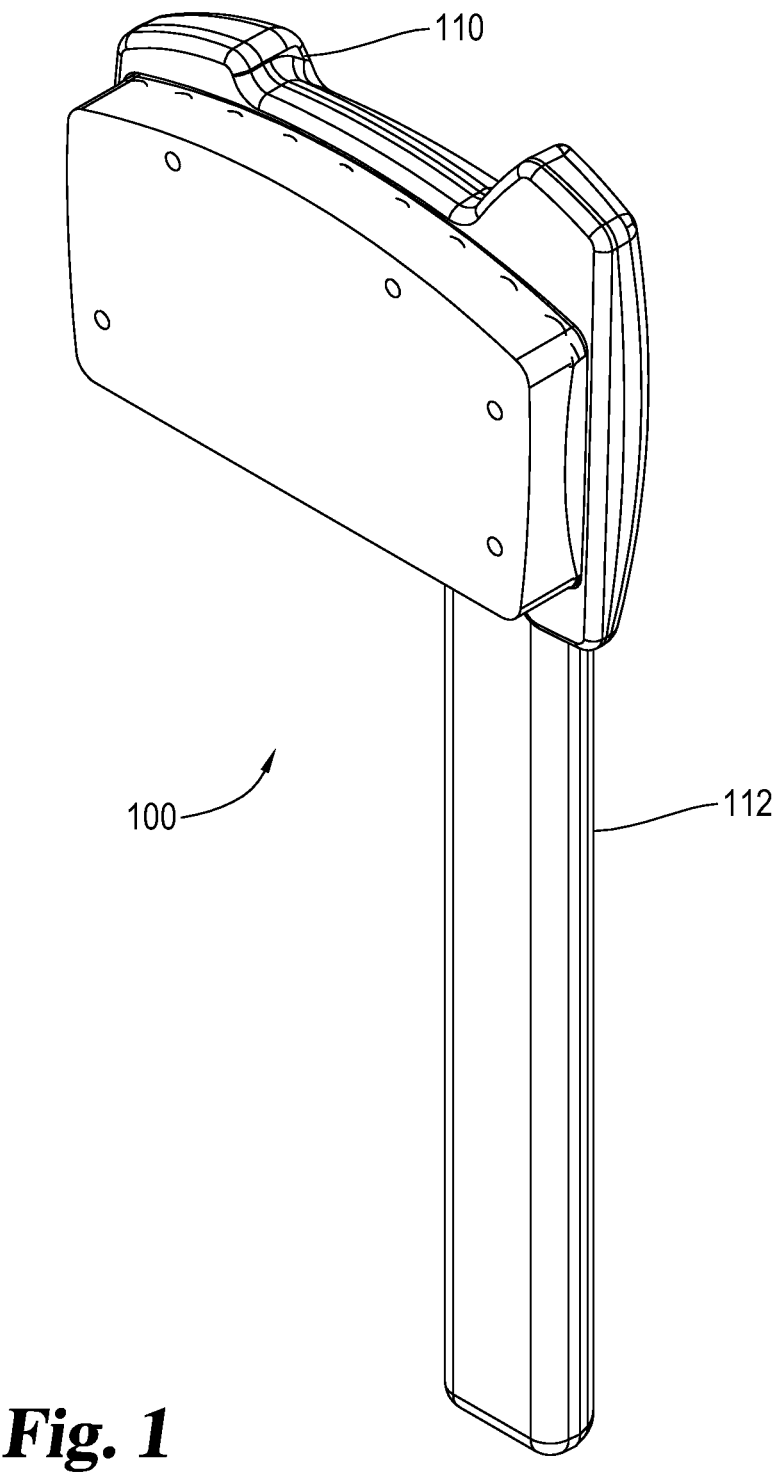
FIG. 1 illustrates a perspective view of a monitoring device for use with liquid food according to one embodiment.
Figure 2:
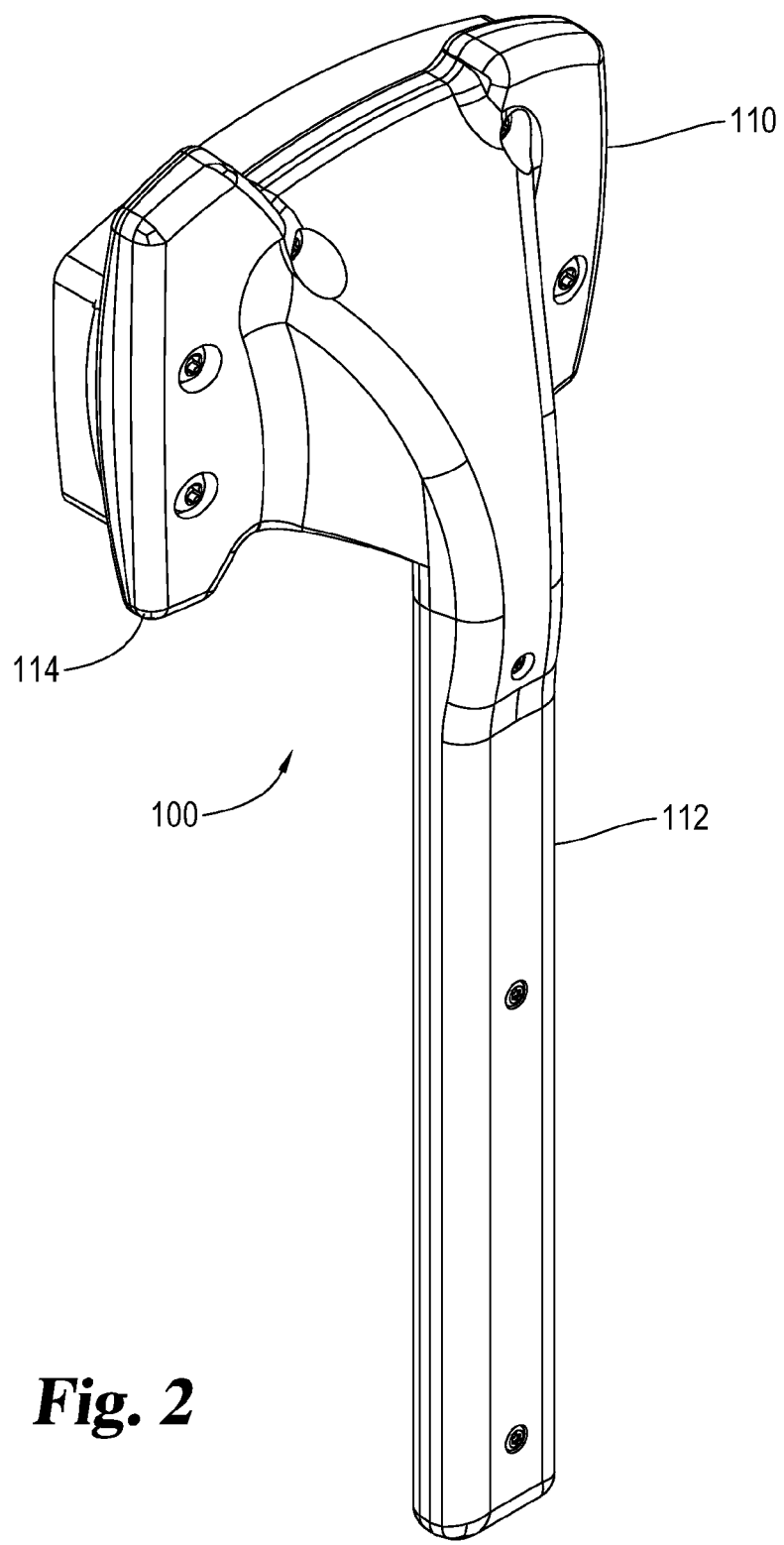
FIG. 2 illustrates a further perspective view of the device of FIG. 1.
Figure 3:
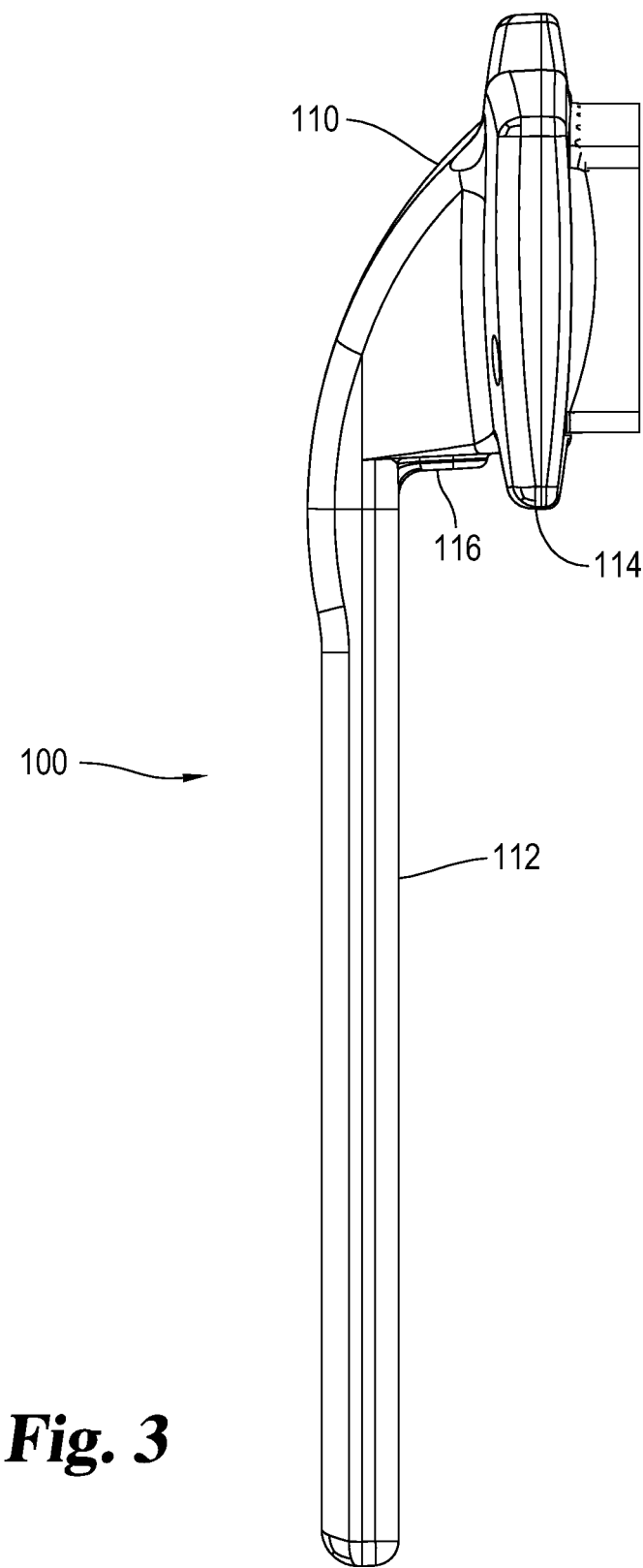
FIG. 3 illustrates a side view of the device of FIG. 1.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

FIGS. 1-6 illustrate a monitoring device 100 for sensing the temperature and level of liquid 166 (e.g., soup) in a container 160. As shown, the monitoring device 100 includes an upper base 110 and an elongate housing member 112 extending downward from the upper base 110. A retaining lip 114 is provided in a lower end 115 of the upper base 110 to maintain the position of the monitoring device 100 when mounted or hung over the upper edge 158 of the container 160, such as a soup well or steam table insert.

Figure 4:
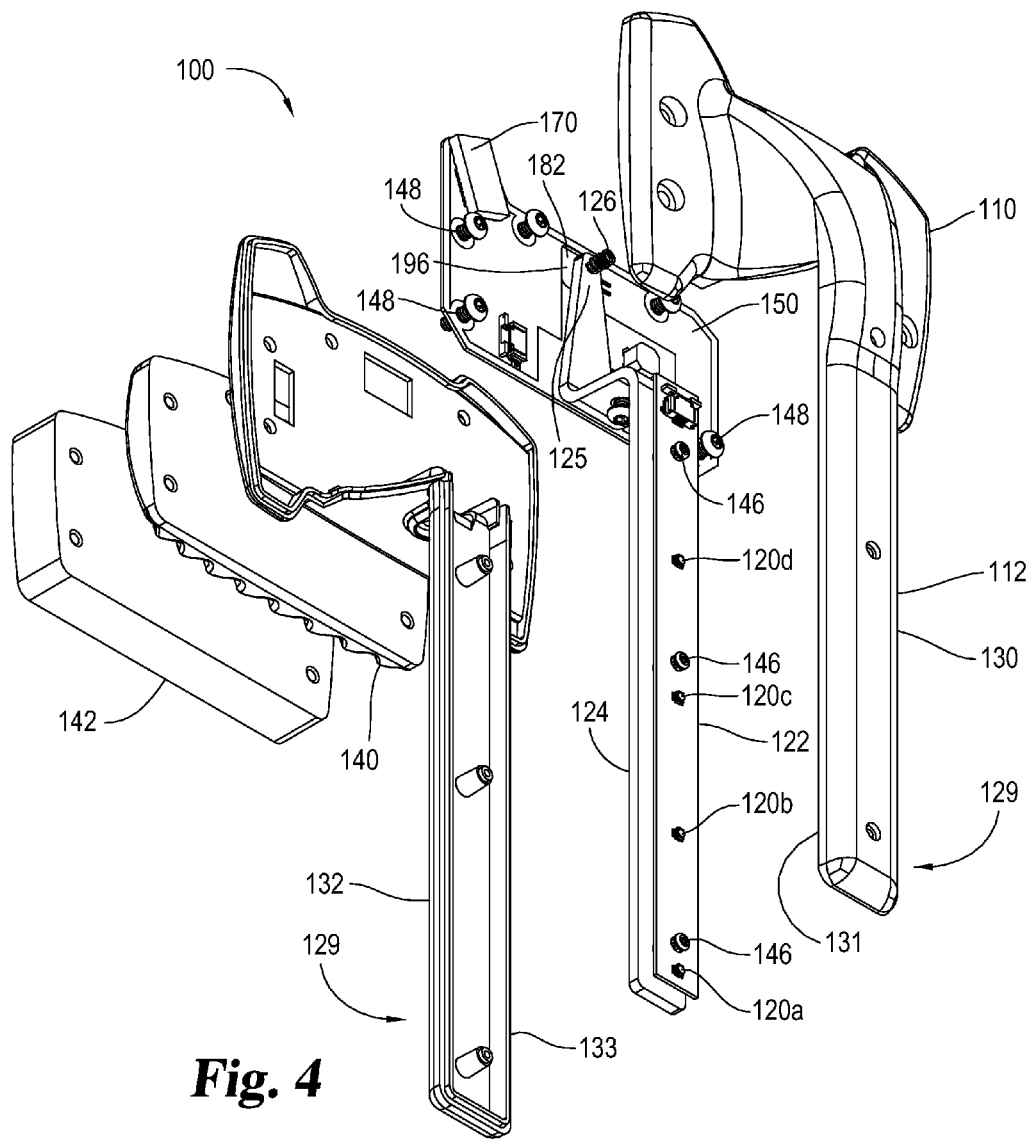
FIG. 4 illustrates a rear perspective exploded view of the device of FIG. 1.
Figure 6:
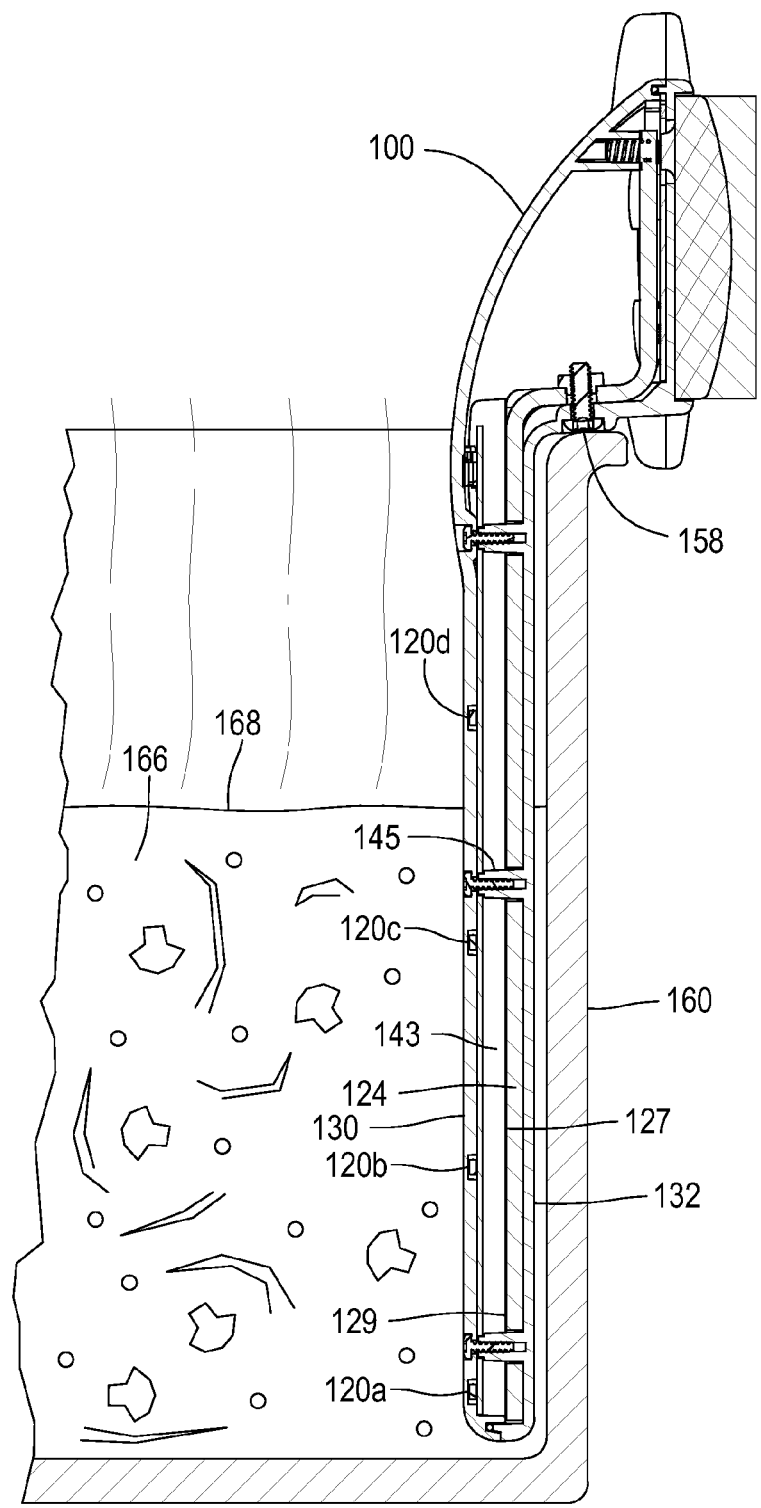
FIG. 6 illustrates a section view of the device of FIG. 1 mounted in a liquid food container.

As shown in FIGS. 4 and 6, the monitoring device 100 includes a plurality of temperature sensors 120a-d which are mounted in a vertically spaced fashion along the length of member 130. The individual temperature sensors 120 sense the temperature of the environment substantially proximate to each sensor 120. The spaced arrangement of the temperature sensors 120 provides for a number of properties of a liquid 166 in the container 160 to be measured. First, the temperature of the liquid 166 is sensed by one or more of the temperature sensors 120 depending on the amount of liquid in the container. In FIG. 6, temperature sensors 120a, 120b, and 120c are submerged within or below the upper level 168 of the liquid and therefore sense the temperature of the liquid 166.

The monitoring device 100 may comprise appropriate circuitry connected to the temperature sensors 120 to determine the liquid temperature by, for example, evaluating the highest value (typically a voltage or current signal) among the sensors 120 to estimate the temperature of the liquid in the container.

In addition to temperature, the monitoring device 100 may be used to determine the volume or level of liquid in the container by comparing the signals received from the individual temperature sensors 120. The level determination is made possible due to the spacing of the temperature sensors and vertical mounting of the monitoring device in the container 160. In the example shown in FIG. 6, sensors 120a, 120b, and 120c are below the upper level of 168 of the liquid 166. Therefore, the temperature reading from those sensors will be significantly higher than those received from temperature sensor 120d. Appropriate circuitry and/or software can then be used to determine that the level 168 of the liquid 166 is somewhere between temperature sensors 120c and 120d. In this way, both the temperature and level of the liquid can be determined using the sensors 120 without the need for separate sensors for the two properties. Using the known geometry or dimensions of the container 160, the volume of the liquid can be further determined or estimated based on the vertical level measurement.

Information received from the sensors 120 may be digitized or otherwise processed to determine the temperature and level of the liquid 166 as discussed above. In certain embodiments, the processing of the raw signals from the sensors 120 may be accomplished using circuitry located within the device 100 itself and then transmitted from the device 100, using a wireless transmitter 170, to an external receiver 192. The wireless transmitter 170 may be optionally implemented as transmitter only or as a transceiver. In other embodiments, the signals from the sensors 120 can be transmitted to the external receiver in the raw or at least partially unprocessed form for processing by the external receiver. In still other embodiments, the signals, in either processed or at least partially unprocessed form, can be transmitted to an external receiver using a wired medium.

Figure 7:
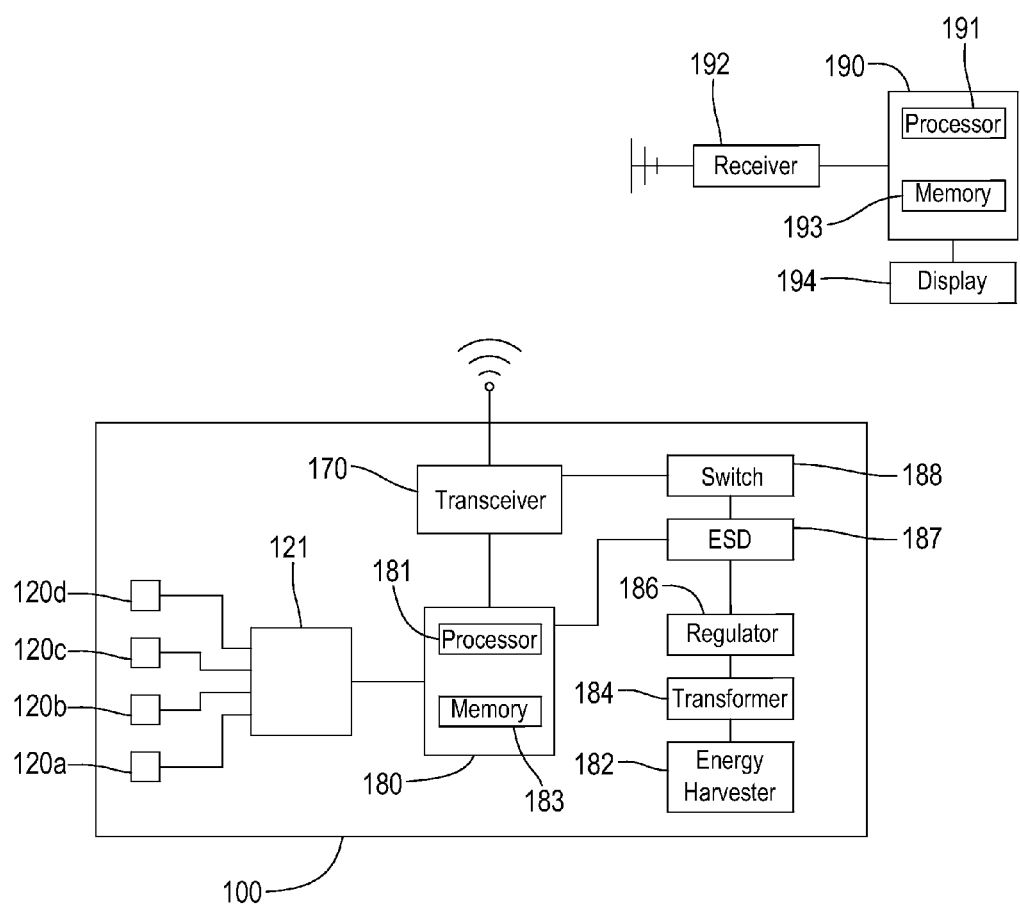
FIG. 7 illustrates a schematic block diagram of a system for monitoring liquid food which incorporates the device of FIG. 1.
Figure 8:
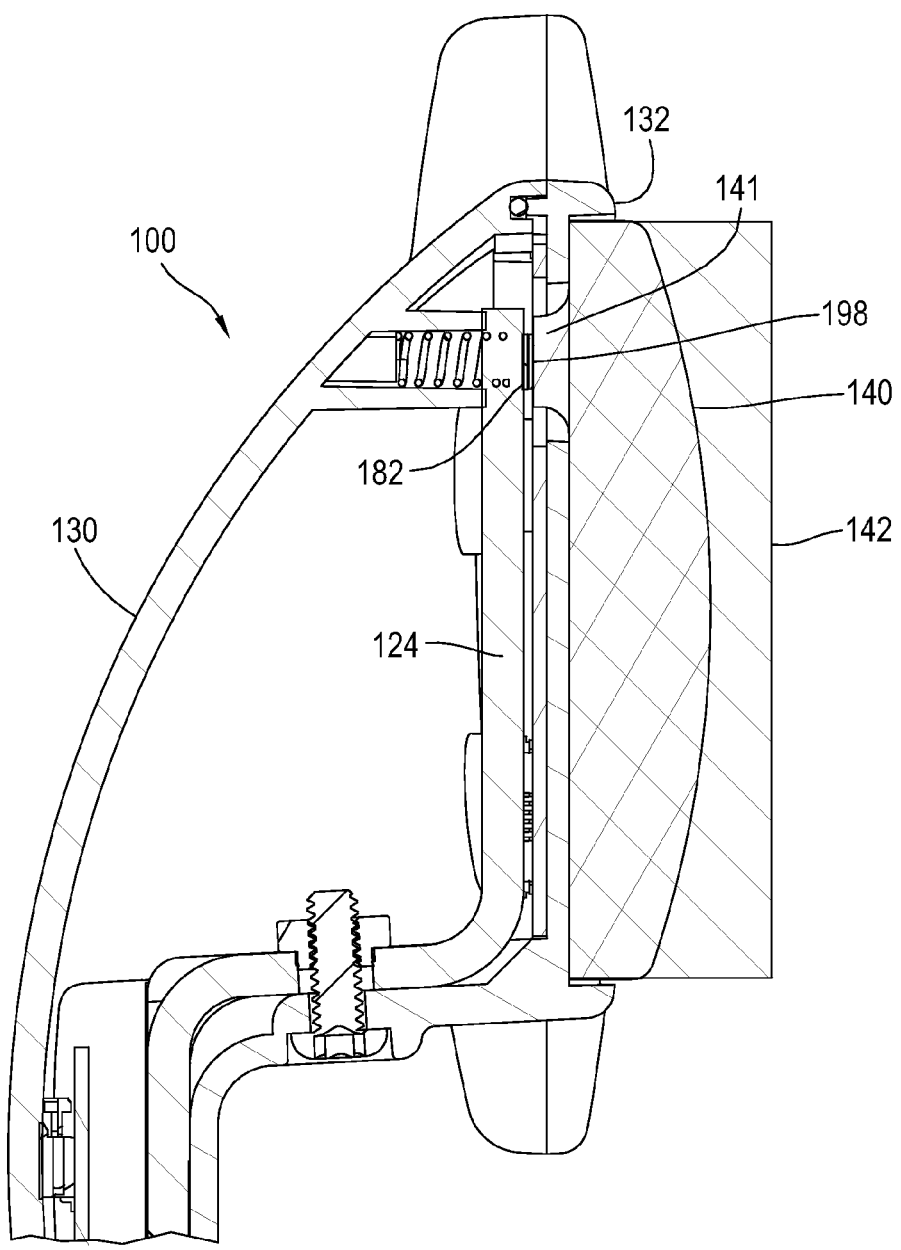
FIG. 8 illustrates detailed section view of the upper portion of the device of FIG. 1
Figure 10:
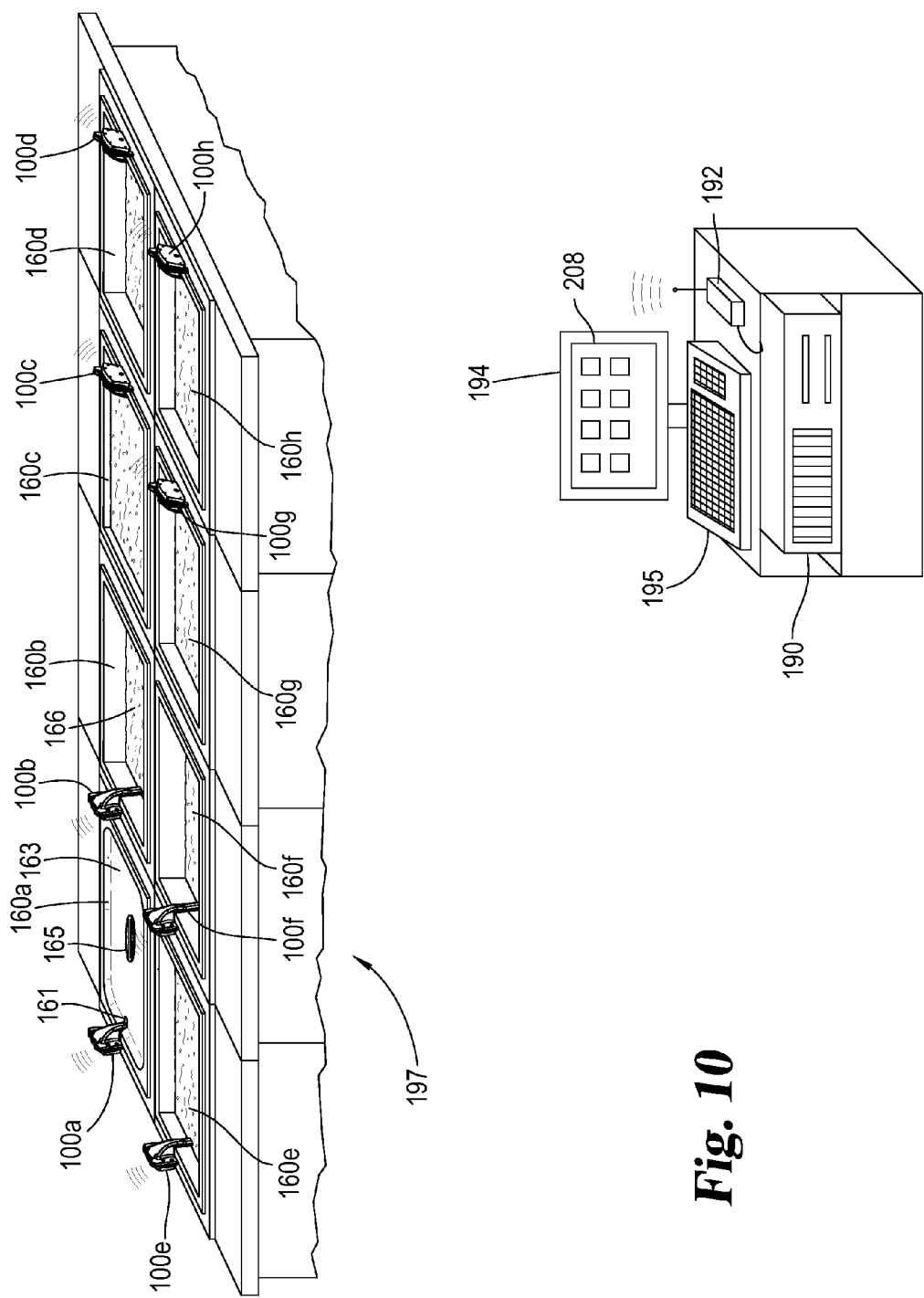
FIG. 10 illustrates a soup warming table including a plurality of soup containers, and a user monitoring station.

FIG. 7 illustrates one example of an arrangement of components within the monitoring device 100. As shown, the monitoring device may include the temperature sensors 120a-d, a sensor processing module 121, a computing module 180, a transmitter 170, an energy harvesting device 182, and transformer 184, and a power regulator 186. The monitoring device 100 may transmit signals to an external receiver 192 which is operatively connected to a data gathering computer 190. The computer 190 receives the signals and information from the monitoring device for further processing and/or recording. FIG. 10 illustrates a view of a soup well counter 197 having a plurality of containers 160a-h for holding soup. As shown, monitoring devices 100a-h are placed in each respective container 160a-h. A lid 163 may optionally be placed over one or more of the containers 160 as shown. The lid 163 may optionally include a handle 165 and an opening 161. The elongate housing member 112 may be optionally sized to fit through the opening 161 when the lid 163 is placed over the container 160. This allows the monitoring device 100 to remain mounted to the container 160 when the lid 163 is in use.

In one embodiment, the monitoring device 100 includes a housing 129 comprising first and second housing portions 130 and 132, respectively. The first and second portions 130 and 132 are preferably configured to form a watertight or hermetic seal when secured together by fasteners, such as screws 146. In one embodiment, the material used to form the first and second housing portions 130 and 132 and the geometry of the contacting surfaces 131 and 133 is selected such that a sufficient seal will be formed when the device is assembled. In other embodiments, a separate gasket or sealing member (not shown) may be included which will be compressed between the housing portions 130 and 132 when assembled, thereby achieving the required seal. The material of the housing 129 may be further selected to be safe for food contact and suitable to withstand high temperatures such as those typically present in a commercial dishwasher.

Figure 9:
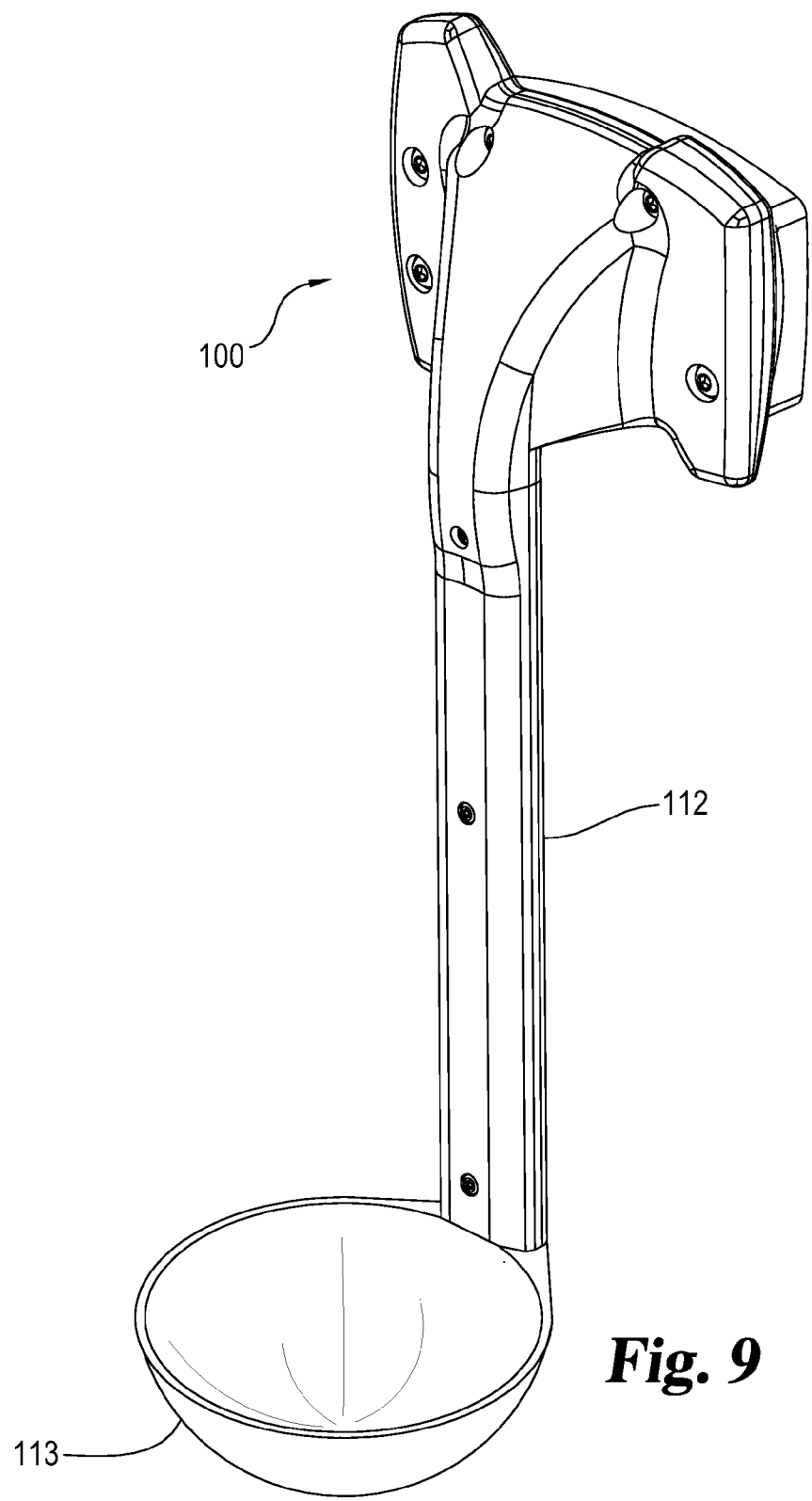
FIG. 9 illustrates a perspective view of a monitoring device incorporating a ladle for use with liquid food.

The illustrated embodiment depicts the elongate housing member 112 as a general stir stick configuration, which can be used to occasionally stir the soup or liquid 166 in addition to functioning as a monitoring device. In other embodiments, the device 100 may incorporate other functionality, such as by including a ladle or spoon portion 113 at the bottom of the member 112 as illustrated in FIG. 9.

As discussed above and shown in FIG. 4, the temperature sensors 120 are preferably mounted in a vertically spaced fashion along the length of the member 112. In the illustrated embodiment, the temperature sensors 120 are mounted to a circuit board 122, which may optionally be implemented as a PCB board or other suitable substrate. Appropriate wiring or conductive tracing may be included to connect the various sensors 120 to processing circuitry located in the upper portion 110. In a preferred embodiment, the temperature sensors 120 comprise thermocouples which output a variable voltage signal within a specified range depending on the temperature of the environment adjacent to the thermocouple. However, other types of temperature sensing devices known in the art may be used to sense the temperatures at the points along the member 112 including, but not limited to, resistive temperature detectors (RTD), infrared sensors, change-of-state sensors, thermometers, and the like. In certain embodiments, the signals from the temperature sensors 120 may be optionally routed through a separate sensor processing module 121, such as a transformer or signal conditioner, before being routed to the computing module 180.

The energy harvesting device 182 may be optionally provided to supply power to electrical components within the monitoring device 100, thereby eliminating the need for batteries. In one embodiment, the energy harvesting device 182 is implemented as a thermo-electric generator (TEG) which converts heat energy from the liquid 166 to electrical energy. In the illustrated embodiment, the energy harvesting device 182 functions by utilizing the temperature difference between the hot liquid 166 and the ambient air based on the "Seebeck Effect." One example of a suitable TEG is the eTEG HV56 Power Generator supplied by Nextreme Thermal Solutions, Inc. of 3908 Patriot Dr., Durham, N.C., USA, although other devices known in the art which converter heat energy to electrical energy may also be used. The electrical energy generated by the energy harvesting device 182 is then operatively directed, via electrical output terminals of the energy harvesting device 182, to the electrical components of the device 100.

In order to supply the greatest temperature differential into the energy harvesting device 182, a hot-side thermal conducting member 124 is mounted within the elongate housing member 112 as shown in FIGS. 4 and 6. The hot-side thermal conducting member 124 is heated due to the presence of hot liquid 166 around the submerged portion of member 112. The hot-side thermal conducting member 124 transmits the heat up to a first thermal terminal 196 of the energy harvesting device 182 mounted in the upper portion 110 as shown in FIG. 4. An upper end 125 of the hot-side thermal conducting member 124 is arranged to be in contact with first thermal terminal 196. Spring 126 may be optionally supplied and mounted as shown to apply a force perpendicular to the upper end 125 toward the first thermal terminal 196, thereby ensuring sufficient contact between the hot-side thermal conducting member 124 and the energy harvesting device 182. A thermally conductive compound or paste may also be optionally placed between the member 124 and terminal 196 to increase the thermal conductivity between the member 124 and terminal 196.

Figure 5:
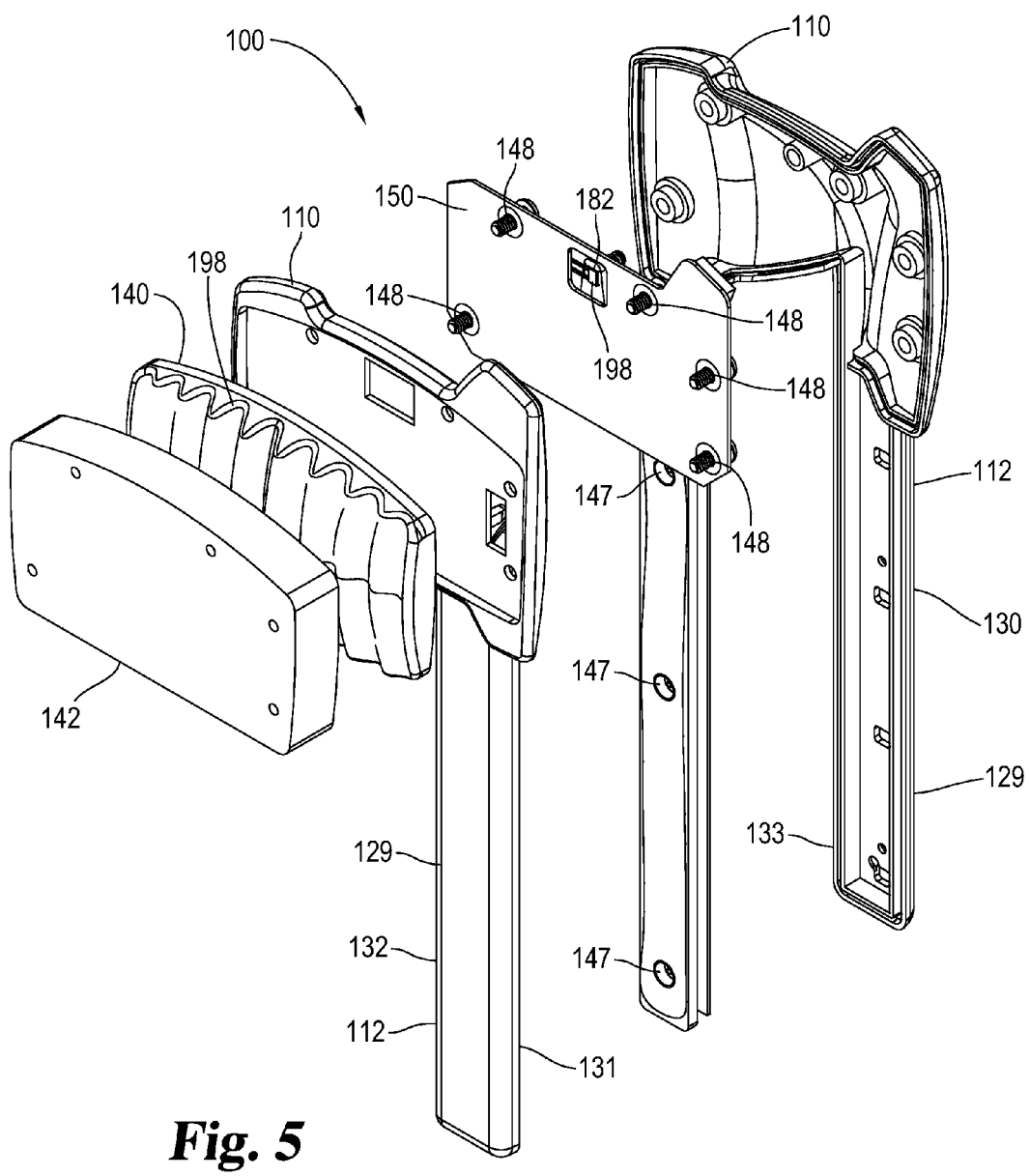
FIG. 5 illustrates a front perspective exploded view of the device of FIG. 1.
Figure 12:
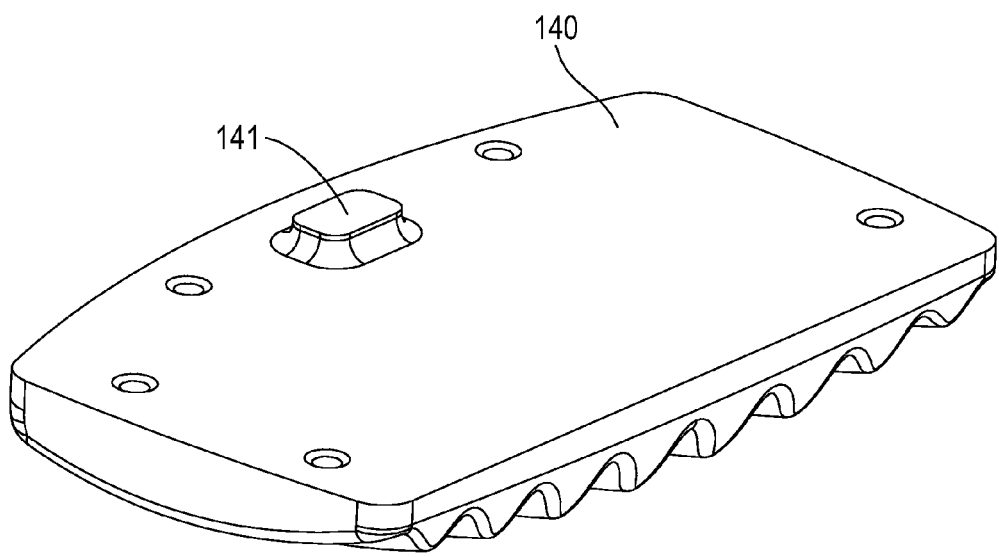
FIG. 12 illustrate a perspective view of a cold-side thermal conducting member of the device of FIG. 1 according to one embodiment.

To supply the coldest temperature possible to the energy harvesting device 182, cold-side thermal conducting member 140 is provided and arranged to contact a second thermal terminal 198 of the energy harvesting device 182 as shown in FIG. 5. As shown in further detail in FIGS. 7 and 12, the cold-side thermal conducting member 140 may further comprise an extending portion 141 which protrudes through the second housing portion 132 and contacts the second thermal terminal 198 of the energy harvesting device 182 when the device 100 is assembled. Again, a thermally conductive compound or paste may also be optionally placed between the member 140 and terminal 198 to increase the thermal conductivity between the member 124 and terminal 196.

As shown in FIG. 4, the hot-side thermal conducting member 124 is preferably formed as a flat bar or strip along the length of the elongate housing member 112, although other geometries may also be used. As shown in FIG. 6, a first side 127 of the hot-side thermal conducting member 124 is mounted against an inner surface 133 of the second housing portion 132 to achieve thermal transfer from the liquid surrounding the device 100 to the hot-side thermal conducting member 124. An air gap 143 is maintained between the opposite side 129 of the member 124 and the circuit board 122 as shown in order to limit thermal leakage from the member 124. The conducting member 124 may be mounted within the device 100 by standoffs 145 which protrude from the second housing portion 132 as shown, although other arrangement to thermally isolate the member 127 and maintain the air gap 143 may also be used.

The cold-side thermal conducting member 140 is preferably formed in a generally rectangular shape, and may optionally include ridges 198 formed therein to provide enhanced thermal transfer between the ambient air surrounding the upper portion 110 and the member 140. Cover 142 is provided as shown to provide sealing and encapsulation around the member 140. When assembled, screws 148 secure the cover 142 to the housing 110. A separate seal or gasket material (not shown) may be optionally provided to further prevent contamination into or out of the device 100.

The hot-side thermal conducting member 124 and the cold-side thermal conducting member 140 are preferably composed of a thermally-conductive material such as copper or aluminum, although other thermally conductive materials known in the art may also be used.

The energy harvesting device 182 generates a voltage due to the difference in temperature between its first and second thermal terminals 196 and 198. This voltage may be optionally increased using a transformer 184 operatively connected to the energy harvesting device 182. One example of a suitable transformer for use as transformer 184 is the LPR6235 model transformer supplied by Coilcraft Inc. of 1102 Silver Lake Road, Cary, Ill., USA. The increased voltage signal from the transformer 184 may then be optionally routed through a regulator 186 operatively connected to the transformer 184. This ensures that the output power signal sent to the computing module 180 is suitable for use by the computing module 180. An example of a suitable regulator for use as regulator 186 is the LTC3108 power manager supplied by Linear Technology of 1630 McCarthy Blvd., Milpitas, Calif., USA. The computing module 180 utilizes the power to perform various operations related to the operation of the device 100.

In certain embodiments, an energy storage device 187, such as a capacitor, may be optionally included to temporarily store energy being generated by the energy harvesting device 182 for later or periodic use. For example, in the case where the energy harvesting device cannot provide enough power to continuously power the computing module 180 and/or the wireless transmitter 170, the energy generated by the energy harvesting device may be stored in the energy storage device. Once the energy level reaches a minimum threshold needed to power the computing module 180 and wireless transmitter 170 for the time required to complete a data set transmission, a switch 188 enables energy flow from the energy storage device 187 to the computing module 180 and wireless transmitter 170. Once powered up, the computing module 180 and wireless transmitter 170 complete transmission of the temperature data to the receiver 192. After the transmission is complete and/or the energy in the energy storage device is depleted, the switch 188 stops the flow of energy from the energy storage device 187 to the computing module 180 and wireless transmitter 170. In this way, the device is able to periodically transmit temperature data to the receiver 192 for use by the data gathering computer 190. A monitoring circuit may be optionally operatively connected to the energy storage device 186 for monitoring the amount of energy stored in the energy storage device 187 and operating the switch 188 as needed. The monitoring circuit may be implemented as a separate component or integrated within the regulator 186 or other component in the device 100.

In certain embodiments, a rechargeable battery (not shown) can be included within the monitoring device 100 to supplement or replace the energy harvesting device 182. An inductive charging system may be further implemented by appropriate circuitry within the monitoring device 100 and an external charger to allow the battery to be charged without opening the housing of the monitoring device 100. For example, the device 100 may be placed into an inductive charging stand when not in use.

In operation, the signals from the temperature sensors 120 are received by the computing device 180 and processed for further transmission to the external data gathering computer 190. The computing device 180 routes the processed signals to the transceiver 170, which preferably transmits the information to the external receiver 192 connected to the data gathering computer 190.

The data gathering computer 190 stores the received information concerning the temperature and/or level information and performs various processing functions on the data. For example, if a low liquid temperature or level is detected, the computer 190 may activate an audible alarm or visual indication on a display 194 connected to the computer 190. The information may also be optionally sent to or used to activate an audio or visual alarm on one or more handheld devices, such as a smart phone or tablet computer. This notifies the appropriate restaurant personnel or franchise organization of the problem and allows corrective measures to be taken. The computer 190 may further include continuous or periodic monitoring and data logging functions for later inspection and to provide verification of compliance with government regulations. The information received by the computer 190 may be optionally organized and stored within a database in electronic memory or storage to facilitate easier retrieval and processing. It shall be understood that multiple monitoring devices 100 can be utilized and configured to transmit data to the data gathering computer 190. When multiple devices 100 are utilized, each device 100 may be optionally assigned a separate identification code, network address, transmission frequency, or the like to allow the data gathering computer 190 to discern between the different signals being sent by the different devices 100.

Figure 11:
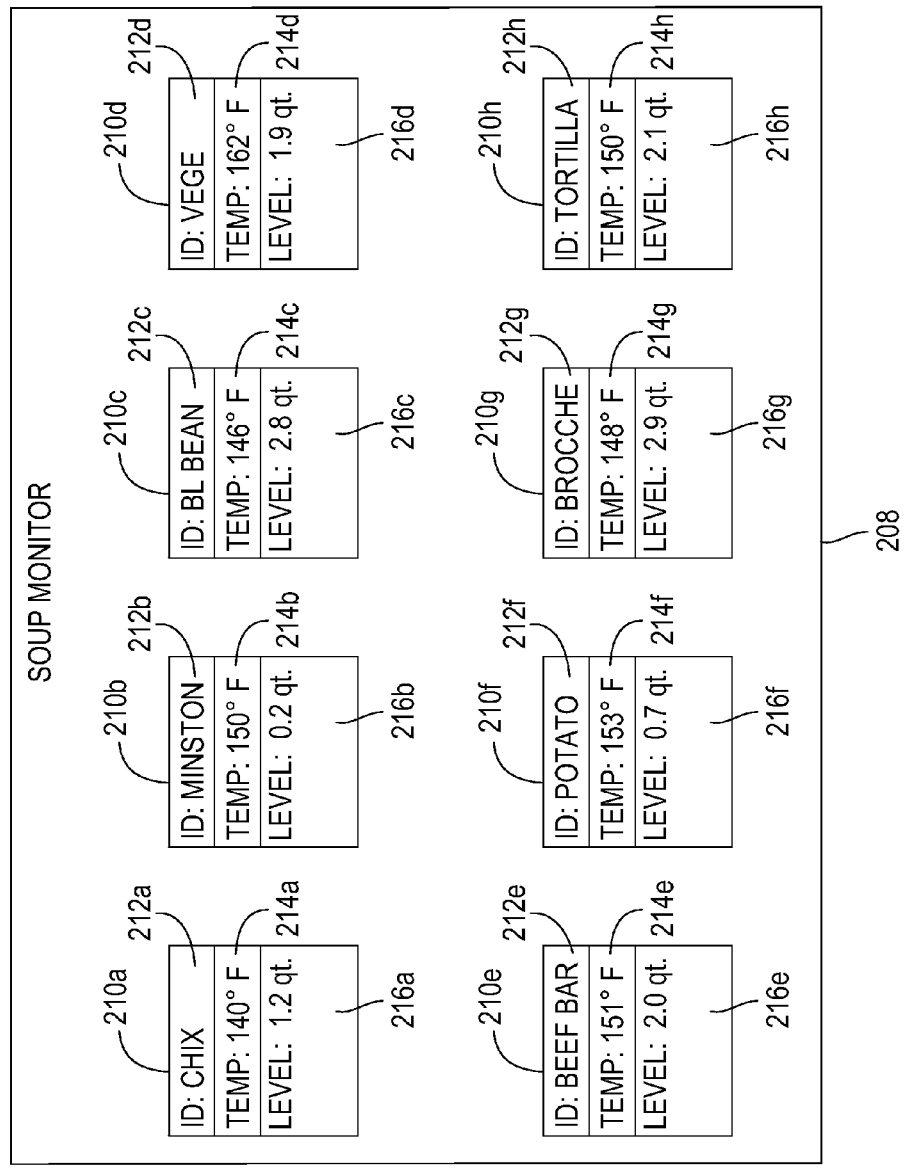
FIG. 11 illustrates a user interface layout for monitoring liquid food according to one embodiment.

FIG. 11 illustrates a user interface 208 for display on the display 194. As shown, the interface may optionally include a plurality of display elements 210, illustrated here as eight display elements 210*a-h*. It shall be understood that more or less than eight control elements 210 may be used depending on the needs of the particular application. Each control element 210 may optionally include an identifier 212, which identifies the type of soup or food in the container 160. In addition, temperature indicators 214 and level or volume indicators 216 may also be included to display the temperature of the soup in each container 160 as shown.

Each of the control elements 210 may be optionally configured to function as controllable fields. For example, by selecting a control element 210, either by using a mouse, keyboard, or by physically touching the corresponding portion of the display 208, the user can select the control element 210, after which the user will be presented with additional information regarding the corresponding container 160 or soup contained therein. As one non-limiting example, the additional information may include historical data regarding the temperature, level, or other properties of the soup. The historical data may be presented in graphical form to better illustrate trends concerning the soup properties over time. In one embodiment, the historical data may be used to identify the busiest times of day for the restaurant, based on the collective or individual soup product usage over time. The data may be also used to determine the demand for various soups or to identify the optimal time to prepare the soups in order to minimize the amount of time the soup needs to be stored while awaiting sale and consumption.

The interface 208 may also be configured to be customizable by the user. For example, each of the control elements may be color coded for easier identification. In addition, the layout 208 may be made to mimic the relative physical location of the individual soup containers 160 in the warming table 197.

Transmission of data from each monitoring device 100 to the data gathering computer 190 may be accomplished over a variety of mediums and protocols including, but not limited to, radio frequency (RF), WIFI, cellular, optical and the like. In addition, although the illustrated embodiment discusses active signal transmission from the monitoring device 100, passive transmission, such as RFID, wherein an external RF signal is used to power the device 100, can also be used.

Computing module 180 and data gathering computer 190 may include one or more processors or CPUs (181 and 191, respectively) and one or more types of memory (183 and 193, respectively). Each processor 181 and 191 may be comprised of one or more components configured as a single unit. When of a multi-component form, a processor 181 or 191 may have one or more components located remotely relative to the others. One or more components of each processor 181 or 191 may be of the electronic variety defining digital circuitry, analog circuitry, or both. Optical computing could be used as an alternative. In one embodiment, each processor 181 and 191 is of a conventional, integrated circuit microprocessor arrangement, such as one or more OPTERON processors supplied by ADVANCED MICRO DEVICES Corporation of One AMD Place, Sunnyvale, Calif. 94088, USA.

Each memory 183 and 193 is one form of a computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types, or other types not included in the above list. Also, each memory may be volatile, nonvolatile, or a hybrid combination of volatile and nonvolatile varieties.

The display 194 may comprise any type of electronic display device known in the art including, but not limited to, liquid crystal displays (LCD), light emitting diode displays (LED), cathode ray tube (CRT) displays, and the like. In addition, the display 194 my be configured as a touch screen for selection or input of information using the interface 208.

The device 100 may be optionally integrated in food service equipment and appliances. For example, the device 100 may be formed into a soup well or container. Applications for the device 100 outside the food service industry are also possible.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A liquid food monitoring device, comprising:
   an upper base;
   a lower elongate housing member extending downward from said upper base;
   a plurality of vertically spaced temperature sensors mounted to said elongate housing member;
   a transmitter operatively connected to said temperature sensors; and
   an energy source operatively coupled to said transmitter, wherein said energy source comprises an energy harvesting device configured to convert heat energy from said liquid food to electrical energy for powering said transmitter.

2. The device of claim 1, wherein said transmitter is a wireless transmitter.

3. The device of claim 1, wherein said transmitter is configured to transmit signals from said plurality of temperature sensors to an external receiver, said signals indicative of temperatures being sensed by said temperature sensors.

4. The device of claim 1, wherein said transmitter is configured to transmit at least one signal to an external receiver, said at least one signal indicative of the level of said liquid food in a container.

5. The device of claim 1, wherein said upper base comprises a retaining lip in a lower end of the upper base to maintain the position of the monitoring device when placed over an upper edge of a container.

6. The device of claim 1, further comprising an elongate hot-side thermal conducting member mounted within said elongate housing member, said hot-side thermal conducting member operatively connected to a first thermal terminal of said energy harvesting device.

7. The device of claim 6, further comprising a cold-side thermal conducting member, said cold-side thermal conducting member operatively connected to a second thermal terminal of said energy harvesting device.

8. The device of claim 1, Wherein the device is configured as a stir stick.

9. The device of claim 1, wherein the device comprises a ladle.

10. The device of claim 1, wherein the device comprises an external housing made of a food grade material.

11. A system for monitoring liquid food in a container, comprising:
    at least one monitoring device configured to be at least partially immersed in said liquid food, said monitoring device having a transmitter and plurality of vertically spaced temperature sensors disposed along an elongate housing member and an energy harvesting device configured to convert heat energy from said liquid food to electrical energy for powering said transmitter; and
    a receiver located remote from the monitoring device and configured to receive signals being transmitted by said transmitter.

12. The system of claim 11, wherein said transmitter is a wireless transmitter.

13. The system of claim 12, wherein said receiver is configured to determine a level of the liquid food in the container by comparing a difference in temperature being sensed by at least two of the temperature sensors.

14. The system of claim 11, wherein the monitoring device further comprises an elongate hot-side thermal conducting member mounted within said elongate housing member, said hot-side thermal conducting member operatively connected to a first thermal terminal of said energy harvesting device.

15. The system of claim 14, wherein the monitoring device further comprises a cold-side thermal conducting member, said cold-side thermal conducting member operatively connected to a second thermal terminal of said energy harvesting device.

16. The system of claim 11, wherein the at least one monitoring device is configured as a stir stick.

17. The system of claim 11, wherein the at least one monitoring device comprises a ladle.

18. The system of claim 11, comprising a plurality of said monitoring devices.

* * * * *